United States Patent [19]

Rienecker et al.

[11] Patent Number: 5,201,423
[45] Date of Patent: Apr. 13, 1993

[54] FIBER SUSPENSIONS SORTER HAVING A PLURALITY OF SCREEN BASKETS

[75] Inventors: Reimund Rienecker, Heidenheim; Peter Schweiss, Langenau; Theodor Bahr, Heidenheim, all of Fed. Rep. of Germany

[73] Assignee: J. M. Voith GmbH, Fed. Rep. of Germany

[21] Appl. No.: 796,054

[22] Filed: Nov. 20, 1991

[30] Foreign Application Priority Data

Nov. 22, 1990 [DE] Fed. Rep. of Germany ....... 4037042

[51] Int. Cl.$^5$ .............................................. B07B 1/04
[52] U.S. Cl. .................................... 209/273; 209/250; 209/305; 210/323.2; 210/415
[58] Field of Search ............... 209/250, 253, 270, 273, 209/289, 305, 306, 379, 380; 210/323.2, 332, 448, 452, 415

[56] References Cited

U.S. PATENT DOCUMENTS

| | | | |
|---|---|---|---|
| 2,682,812 | 7/1954 | Mathewson | 209/270 |
| 2,707,905 | 5/1955 | Mathewson | 209/270 |
| 3,767,047 | 10/1973 | Rasmussen | 209/240 |
| 3,874,509 | 4/1975 | Parker et al. | 209/273 X |
| 5,000,842 | 3/1991 | Ljokkoi | 209/306 X |

FOREIGN PATENT DOCUMENTS 0036329 1/1982 European Pat. Off. .

Primary Examiner—Donald T. Hajec
Assistant Examiner—Tuan N. Nguyen
Attorney, Agent, or Firm—Baker & Daniels

[57] ABSTRACT

The invention concerns a sorter with at least two screen baskets in a housing unit. The invention is characterized in that with screen basket diameters of at least 600 mm the at least two screen baskets are contained side by side, spaced, in an arrangement such that their longitudinal center axes extend parallel to each other and their end sides or end surfaces are contained each in identical planes extending perpendicularly to the longitudinal center axes of the screen baskets.

12 Claims, 2 Drawing Sheets

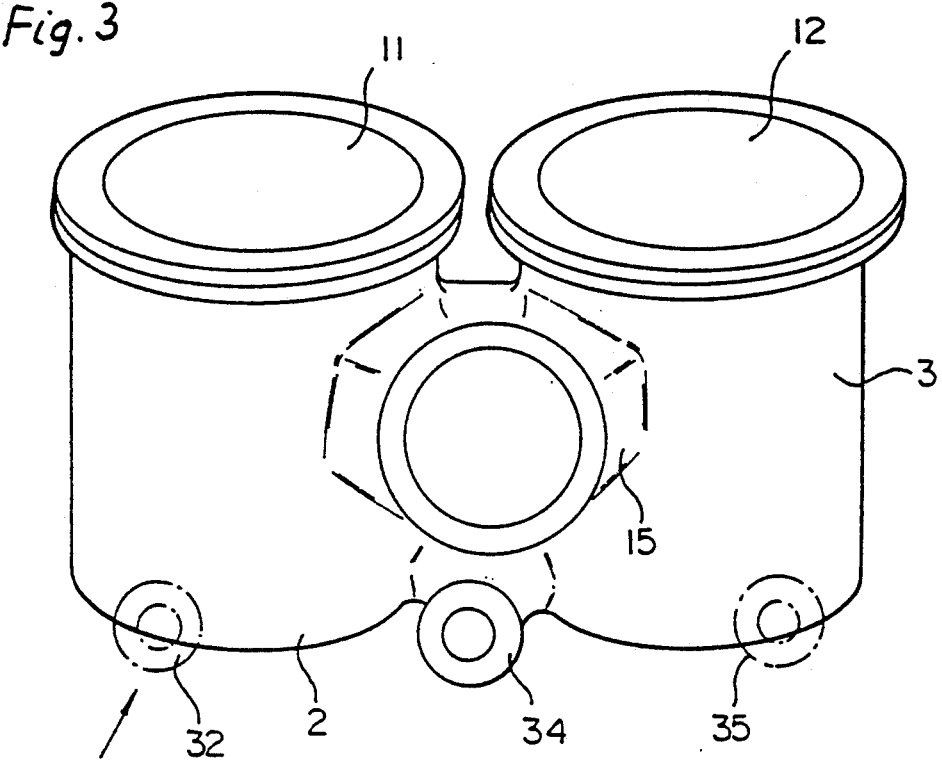
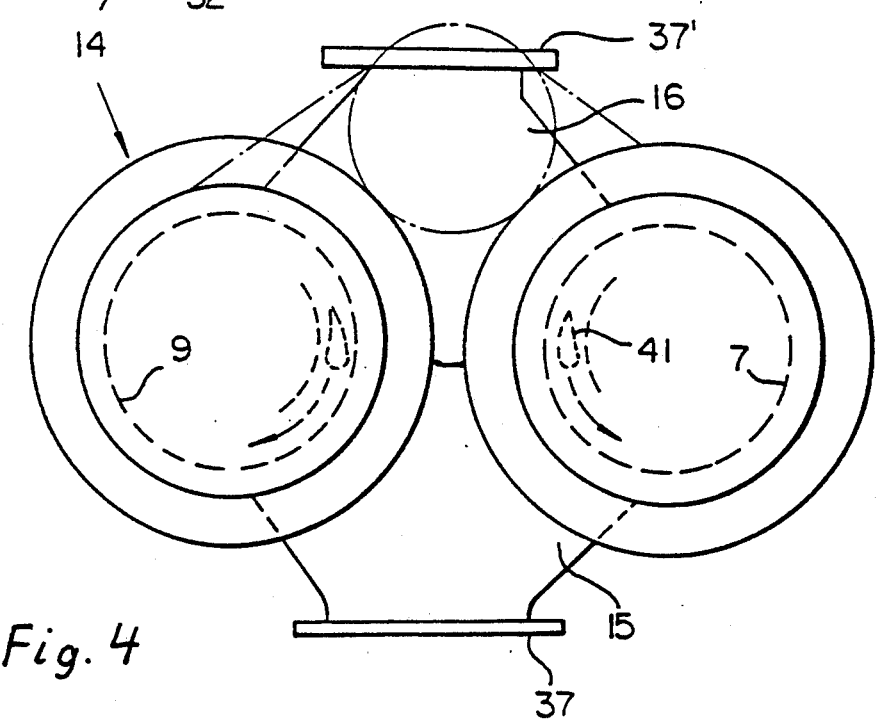

FIBER SUSPENSIONS SORTER HAVING A PLURALITY OF SCREEN BASKETS

BACKGROUND OF THE INVENTION

The invention concerns a sorter with at least two screen baskets, specifically for fiber suspensions. A sorter of this general type is known from EP-A 36329. On this sorter, two screen basket pairs are arranged coaxially one above the other, or one behind the other in a housing. A concentric arrangement of screen basket pairs has the disadvantage that the rotor for the sorting elements must feature support arms on which stock can easily accumulate. Furthermore, also the mounting of the screen baskets, at least of the inner screen basket, is rather difficult to manage. Screen baskets arranged coaxially one behind the other result in a relatively large overall height of the housing unit, causing as well considerable problems in terms of assembly, design and foundry technique. Also using a single, very long screen basket involves the great disadvantage of a very high housing and free installation space above the housing for mounting the screen basket.

The problem underlying the invention is to provide a housing unit where a large screen surface is available without encountering the aforementioned disadvantages. This problem is inventionally solved through the features of the present invention.

SUMMARY OF THE INVENTION

Due to the inventional arrangement of screen baskets side by side in a housing unit, and not one behind the other as with the prior art, the above design and mounting disadvantages are essentially avoided. Any number of screen baskets may be arranged in a housing unit, but two, maximally three screen baskets arranged side by side in a housing unit are preferred. An elliptic cross section is preferably used in the case of two screen baskets per housing unit. The arrangement of two housings having a circularly cylindrical cross section and being connected through inlet and outlet sockets for accepts (screen passage) also offers advantages though. Involved here, for strength reasons, are the slightest necessary wall thicknesses for the two housing parts to be united.

The present invention, in one form thereof, comprises a sorter for fiber suspensions, specifically for the sorting of imprinted wastepaper. The sorter includes a housing unit, and a plurality of screen baskets positioned in the housing unit. The screen baskets each have a diameter of at least 600 mm, and are situated generally side by side in the housing unit. Each screen basket has a longitudinal center axis and includes end faces. The screen baskets are spaced such that the center axes extend generally parallel to each other and the end faces are located in the same planes, the planes being situated generally perpendicular to the longitudinal center axes of the screen baskets. A rotor is disposed interiorly of each screen basket, and a plurality of pulsation elements is attached to each rotor.

BRIEF DESCRIPTION OF THE DRAWINGS

The invention will hereafter be explained with the aid of embodiments illustrated in the figures of the drawing.

FIG. 3, a perspective view of a second embodiment taken along lines 2—2 of FIG. 1 of the invention, and FIG. 4 shows a plan view of the embodiment of FIG. 3.

Corresponding reference characters indicate corresponding parts throughout the several views. The exemplifications set out herein illustrate preferred embodiments of the invention, and such exemplifications are not to be construed as limiting the scope of the invention in any manner.

DESCRIPTION OF THE PREFERRED EMBODIMENT

Figure 1:
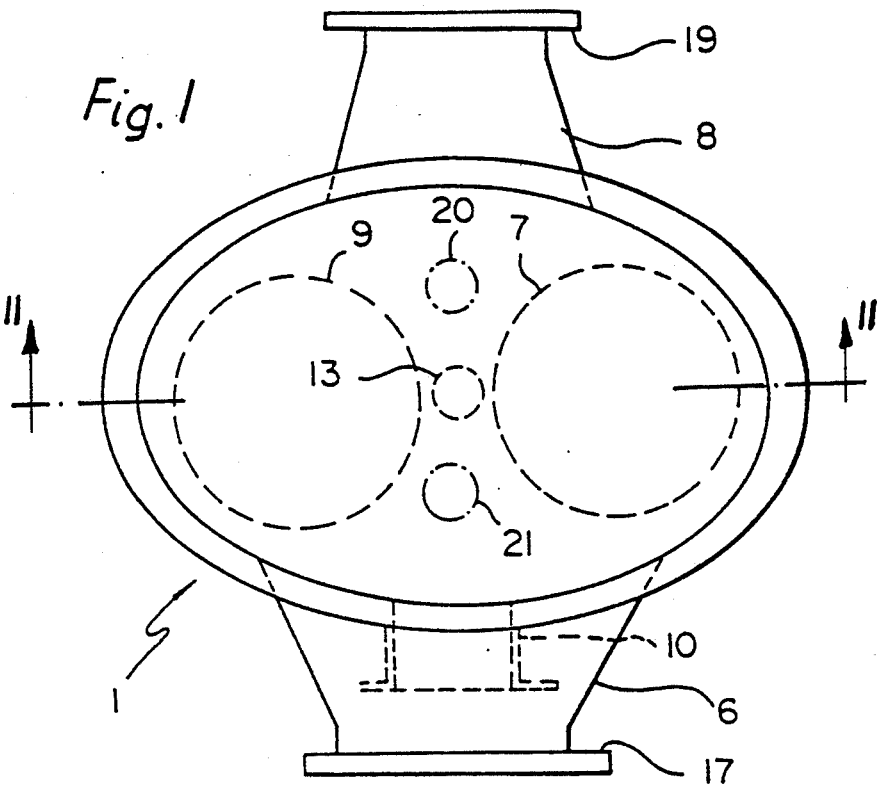
FIG. 1 shows a plan view of an embodiment of the present invention.

The housing in FIG. 1 features, symmetrically to the longitudinal center axes of the screen baskets 7 and 9 illustrated by broken line and arranged side by side, opposite one another, an inlet socket 6 and an outlet socket 8 for accepts (screen passage). The sockets are provided with flanges 17, 19 respectively, for connection to pipe lines. As a result of their large diameter of possibly more than 100 cm, the inlet socket and outlet socket for the screen passage are both located on the actual housing main part, i.e., none of them on the lid. Thus, the top edge—edge near the lid—of the inflow opening of the housing is practically located near the top edge of the respective screen basket. In case of a screen basket overhaul and, consequently, a disassembly of them, pipe lines need therefore not be disassembled. Preferably, each of the screen baskets has a diameter of at least 600 mm.

Naturally, the inlet socket 6 is located closer to the lid 25 than the outlet socket 8 for accepts (screen passage), with the flow at the inlet socket 6 proceeding initially toward the lid 25. It reverses then and the stock proceeds into the space between the rotors 22 and 23 and the surrounding screen basket 7 and 9. In order to guide the flow and separate the influx side from the accepts side located radially outside the screen baskets, a truncated cone-shaped support and barrier wall, or partition, 36, 38 respectively, surrounding the screen basket is provided, the diameter of which decreases steadily toward the lid 25. Thus, the flow cross section increases toward the lid 25. Similarly, the flow cross section from the end of the screen baskets near the lid 25 increases toward their center and other end area. A partition 39 also separates—i.e., in conjunction with the truncated cone-shaped walls—the inlet side of the housing from the accepts side of the screen baskets.

An outlet socket for the tailings may be provided in the area of each screen basket, but also a single, appropriate outlet socket according to FIG. 3 is possible. The housing is connected with the lid 25 through appropriate flanges 26 and 27. The rotors 22 and 23 support wing-shaped sorting elements 24. They are held on shaft 28 and 29, which here feature a pulley 30 and 31 each for driving the rotors. A drive motor of its own may be provided for each rotor, but it is also possible—when not using pulleys—to couple the two rotors or their drive shafts through a gearbox.

The partition 39 may additionally be supported by a brace 13 or, better yet, for safety reasons in case it should sometime be stressed by large pressure differences, by two braces 20 and 21 arranged symmetrically to the connecting plane of the center axes of the screen baskets and to the center axes.

It is favorable, as illustrated, to provide only a single inlet and outlet socket for accepts (screen passage), because controlling the throughput of the housing is then the simplest.

FIG. 3 illustrates an embodiment where two essentially cylindrical housings 2 and 3 are connected with each other through inlet sockets 15 and outlet sockets 16 for accepts (screen passage). These sockets preferably flare very heavily toward the circumference of the individual housing parts 2, 3. This makes for large entrance and exit cross sections in the area of the walls of the housing parts 2 and 3. Otherwise, the interior of the housing unit looks similar as in the case of FIG. 2, concerning the screen baskets and the reversing walls, etc. An outlet socket 34 for tailings is indicated, but each housing part 2, 3 could also feature an appropriate outlet socket of its own, a indicated by broken line at 32 and 35. Each housing part has a lid 11 and 12, respectively. The inlet socket 15 and outlet socket 16 feature flanges 37 and 39, respectively, for connection to pipe lines. Overall, a very stable housing unit 14 is obtained.

The illustrated housing units have the advantage of having a relatively small overall height.

Indicated in FIG. 4 at the exit socket 16, by broken line, is additionally that its inlet opening may also have an upward orientation, i.e., that the last end of it may also be directed against the lid 11 and 12, or upward. Therefore, as illustrated, the throat of the socket at the housing circumference may be made relatively wide while in exchange making the height of the exit opening of the outlet for accepts relatively low, so that the screen height, overall, may be kept relatively small (refer also to FIG. 2). Thus, the necessary screen surface may then be achieved more so through a larger screen diameter than through a greater screen height.

As additionally indicated in FIG. 4 by broken line, the direction of rotation of the rotors will be chosen opposite. The pulsation elements 41 generating pulsations—generally the shapes designed as hydrofoils—of the rotor should preferably not, as illustrated there, rotate in time—although at same speed—but should be staggered so that in the approach area of two pulsation elements of the rotors that of the one rotor will be contained in the center of the gap of the pulsation elements of the rotor, in the greatest mutual area of approach of the pulsation elements of both rotors. They are distributed in a great number across the circumference and height of the screen baskets. The counterrotation of the rotors is indicated by dashed arrows in FIG. 4.

Figure 2:
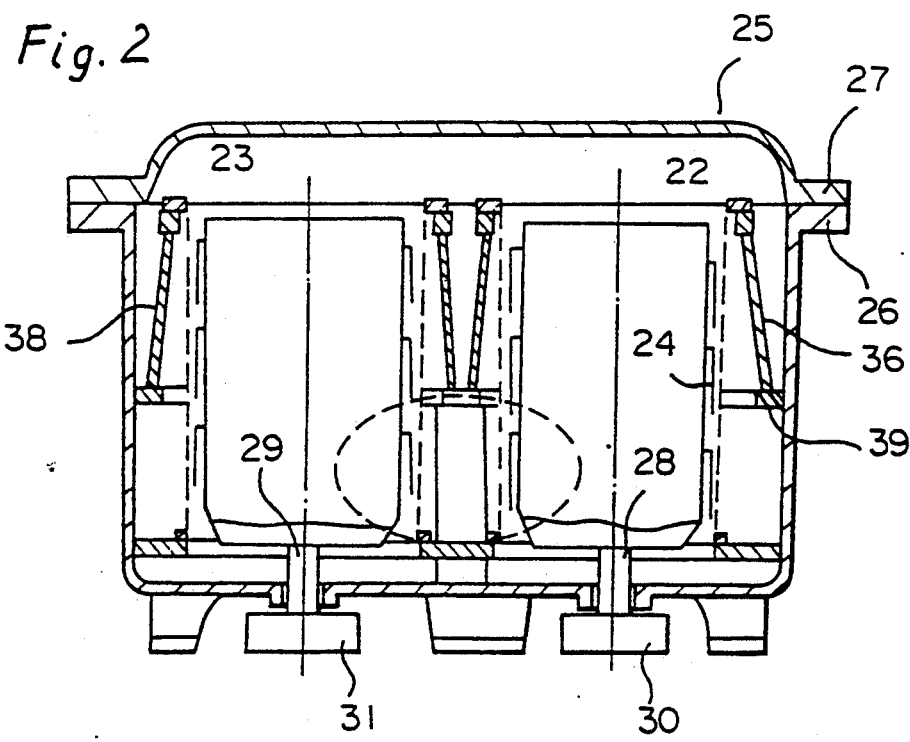
FIG. 2 shows a cross section of a first embodiment.

All of these designs, naturally, apply also the embodiment with the elliptic housing cross section according to FIG. 2.

The rotors may be driven by a gearbox, so that they rotate at the same speed of rotation. But one may also provide a drive of its own for each of the rotors and accomplish through a control that the pulses caused by the pulsating elements will be minimally felt at the end of the exit socket 1, that is, that they have a minimum amplitude or that the sum of the oscillations generated by the two rotors has a waviness with a minimal amplitude.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sorter for fiber suspensions, comprising:
    a housing unit;
    a plurality of screen baskets positioned in said housing unit, each screen basket having a longitudinal center axis and having respective end faces, said screen baskets being spaced such that said center axes extend generally parallel to each other and said end faces are located in the same planes, said planes being situated generally perpendicular to said longitudinal center axes of the screen baskets;
    a rotor disposed interiorly of each screen basket;
    a plurality of pulsation elements attached to each rotor;
    an inlet socket for said fiber suspension and an outlet socket for passing an accepts portion of said suspension from each said basket, wherein said inlet and outlet sockets are positioned generally symmetrical to the longitudinal center axes of said screen baskets;
    in which said sorter includes two screen baskets situated generally side by side, each screen basket being enclosed in a separate housing wherein said housings are connected to one another and supported by way of said inlet socket, said inlet socket being arranged midway of said housings, and by way of said outlet socket.

2. The sorter of claim 1, wherein said housing sockets are additionally supported by at least one outlet socket for a rejects portion of said suspension.

3. The sorter of claim 1, wherein said housings are substantially of round configuration in cross section taken transversely to said longitudinal center axes of said screen baskets.

4. The sorter of claim 2, wherein said housings are substantially of round configuration in cross section taken transversely to said longitudinal center axes of said screen baskets.

5. The sorter according to claim 1, wherein each housing includes a single inlet socket and a single outlet socket.

6. The sorter of claim 1, in which each said housing includes a lid, an inlet socket and an outlet socket, said inlet sockets and said outlet sockets being positioned below said lids, wherein for each respective housing the inlet socket is positioned at a lesser distance from the lid than the outlet socket.

7. The sorter of claim 1, including a single withdrawal socket for a rejects portion of said suspension.

8. The sorter of claim 1, including a generally conic support and barrier wall surrounding each said screen basket and being positioned generally adjacent said lid, said support and barrier wall being adaptable to block said generally conic wall decreasing as said wall approaches said lid from a center portion of said screen basket resulting in a channel for said fiber suspension, said channel having an increasing flow cross section toward said lid.

9. The sorter of claim 8, including a partition on the lower end of said generally conic support and barrier wall at said center portion of the screen basket, said partition being oriented generally perpendicular to said longitudinal center axis, and being positioned to block said inlet socket from said outlet socket.

10. The sorter of claim 1, wherein the position of the pulsation elements, based on outlet sockets arranged symmetrically to said screen baskets, is asymmetric in relation to circles of rotation of said pulsation elements.

11. The sorter of claim 1, wherein each said rotor includes pulsating elements and is powered by a drive, said drive being controlled in contingence on measured values of oscillation pulses generated by said pulsating elements of the rotors at the end of said outlet socket, wherein a minimum pulse amplitude of the overall oscillation is accomplished at the end of said outlet socket.

12. The sorter of claim 2, wherein each said rotor includes pulsating elements and is powered by a drive, said drive being controlled in contingence on measured values of oscillation pulses generated by said pulsating elements of the rotors at the end of said outlet socket, wherien a minimum pulse amplitude of the overall oscillation is accomplished at the end of said outlet socket.

* * * * *

UNITED STATES PATENT AND TRADEMARK OFFICE
CERTIFICATE OF CORRECTION

PATENT NO. : 5,201,423
DATED      : April 13, 1993
INVENTOR(S): Reimund Rienecker, et al.

It is certified that error appears in the above-identified patent and that said Letters Patent is hereby corrected as shown below:

Column 4, line 56, after "said", (1st. occ.) insert --inlet socket from said outlet socket, the diameter of said--.

Column 6, line 8, replace "wherien" with --wherein--.

Signed and Sealed this

Thirtieth Day of November, 1993

Attest:

BRUCE LEHMAN

Attesting Officer

Commissioner of Patents and Trademarks